United States Patent
Deguchi et al.

(10) Patent No.: US 9,598,573 B2
(45) Date of Patent: Mar. 21, 2017

(54) CURABLE RESIN COMPOSITION, RESIN COMPOSITION, RESIN SHEET FORMED BY USING SAID CURABLE RESIN COMPOSITION AND RESIN COMPOSITION, AND CURED MATERIALS THEREOF

(71) Applicant: ADEKA CORPORATION, Tokyo (JP)

(72) Inventors: Yuichiro Deguchi, Tokyo (JP); Takahiro Mori, Tokyo (JE); Yoshihiro Fukuda, Tokyo (JP); Takeru Ohtsu, Tokyo (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 14/405,810

(22) PCT Filed: Jun. 7, 2013

(86) PCT No.: PCT/JP2013/003603
§ 371 (c)(1),
(2) Date: Dec. 5, 2014

(87) PCT Pub. No.: WO2013/183303
PCT Pub. Date: Dec. 12, 2013

(65) Prior Publication Data
US 2015/0175799 A1    Jun. 25, 2015

(30) Foreign Application Priority Data
Jun. 8, 2012    (JP) .................................. 2012-130698

(51) Int. Cl.
| C08L 63/00 | (2006.01) |
| C08L 79/04 | (2006.01) |
| C08G 59/32 | (2006.01) |
| C08G 59/40 | (2006.01) |
| C08G 59/50 | (2006.01) |
| C08J 5/18 | (2006.01) |
| C08J 7/04 | (2006.01) |

(52) U.S. Cl.
CPC .............. *C08L 63/00* (2013.01); *C08G 59/32* (2013.01); *C08G 59/3218* (2013.01); *C08G 59/3227* (2013.01); *C08G 59/4014* (2013.01); *C08G 59/5073* (2013.01); *C08J 5/18* (2013.01); *C08L 79/04* (2013.01); *C08J 7/047* (2013.01); *C08J 2363/00* (2013.01); *C08J 2367/02* (2013.01); *C08J 2379/04* (2013.01); *C08J 2379/08* (2013.01); *C08J 2463/00* (2013.01); *C08J 2463/02* (2013.01); *C08J 2463/04* (2013.01); *C08J 2463/06* (2013.01); *C08J 2479/04* (2013.01)

(58) Field of Classification Search
CPC ................................. C08L 63/00; C08L 79/04
See application file for complete search history.

(56) References Cited

U.S. PATENT DOCUMENTS

| 4,518,786 | A | 5/1985 | Wang et al. |
| 5,317,068 | A * | 5/1994 | Watanabe .......... C08G 59/3218 525/524 |
| 8,034,453 | B2 | 10/2011 | Wang et al. |
| 8,388,733 | B2 | 3/2013 | Yamaoka et al. |
| 8,470,918 | B2 | 6/2013 | Hirose et al. |
| 2009/0215943 | A1 | 8/2009 | Hirose et al. |
| 2010/0087587 | A1 | 4/2010 | Wang et al. |
| 2010/0178487 | A1* | 7/2010 | Arai ........................... C08J 5/24 428/300.1 |
| 2010/0199840 | A1 | 8/2010 | Yamaoka et al. |
| 2012/0309923 | A1* | 12/2012 | Ogawa ................... C08G 59/28 528/99 |
| 2013/0005855 | A1 | 1/2013 | Arai et al. |

FOREIGN PATENT DOCUMENTS

| JP | 01-149822 | 6/1989 | |
| JP | 05-201941 | 8/1993 | |
| JP | 06-233486 | 8/1994 | |
| JP | 2000007763 A | 1/2000 | |
| JP | 2001114915 A | 4/2001 | |
| JP | 2009082842 A | 4/2009 | |
| JP | 2011162710 A | 8/2011 | |
| JP | WO 2011099292 A1 * | 8/2011 | ............. C08G 59/28 |
| JP | 2012505267 A | 3/2012 | |
| WO | 2007037500 A1 | 4/2007 | |
| WO | 2011118106 A1 | 9/2011 | |

OTHER PUBLICATIONS

Lee et al., "Handbook of Epoxy Resins," (1967), pp. 10-17.*
International Search Report from PCT/JP2013/003603 dated Sep. 10, 2013.

* cited by examiner

*Primary Examiner* — Randy Gulakowski
*Assistant Examiner* — Ha S Nguyen
(74) *Attorney, Agent, or Firm* — Millen White Zelano & Branigan, P.C.

(57) ABSTRACT

A curable resin composition which comprising (A), (B) and (C) as follows: (A) 100 parts by mass of polyfunctional epoxy component which contains (A1) a trifunctional epoxy compound having three glycidyl groups in a molecule and (A2) a tetrafunctional epoxy compound having four glycidyl groups in a molecule, wherein (A1):(A2) is 10:90 to 90:10 in terms of mass; (B) 25 to 200 parts by mass of a cyanic acid ester compound having two or more of cyanato groups; and (C) 0.5 to 20 parts by mass of an imidazole compound as a curing agent.

8 Claims, No Drawings

CURABLE RESIN COMPOSITION, RESIN COMPOSITION, RESIN SHEET FORMED BY USING SAID CURABLE RESIN COMPOSITION AND RESIN COMPOSITION, AND CURED MATERIALS THEREOF

TECHNICAL FIELD

The present invention relates to a curable resin composition comprising a polyfunctional epoxy compound having a specific structure, a cyanic acid ester and a curing agent of imidazole compound, a resin composition, a resin sheet thereof, and cured materials thereof which are excellent in an electrical performance, adhesive properties and a heat resistance.

BACKGROUND ART

A curable composition containing an epoxy resin and a cyanic acid ester has an excellent electrical performance together with a high heat resistance and superior adhesive properties. Therefore, it is used for various kinds of members in the electrical or electronic field such as a printed wiring board and an insulating sealing material for a semiconductor.

In addition, in cases where it is used as a sealing material for a power semiconductor and a LED, an adhesive agent and an adhesive base material, a resin composition further containing a filler component and a resin sheet thereof, which have heat diffusion characteristics, are used.

For example, there were disclosed an epoxy resin composition, containing a polyfunctional epoxy compound such as trifunctional epoxy or tetrafunctional epoxy aromatic compound, a phenol-modified polyphenylene ether, a cyanate compound and a curing accelerator as an essential component, and has a high heat resistance, a low dielectric tangent and excellent adhesive properties (Patent document 1); and a prepreg which contains a cyanate resin, an epoxy resin, an imidazole compound and an inorganic filler as an essential component, and has a low dielectric constant, excellent laser machining properties and a high flame retardancy (Patent document 2).

Furthermore, there were disclosed a resin composition containing a cyanate resin and/or a prepolymer thereof, an epoxy resin having no halogen atoms, an imidazole compound and an inorganic filler as an essential component, and has a flame retardancy and a high heat resistance along with a low expansion coefficient (Patent document 3); a resin composition for a soldar resist containing a cyanate resin and/or a prepolymer thereof, an epoxy resin not having no halogen atoms, a phenoxy resin, an imidazole compound and an inorganic filler, and has a low linear expansion coefficient, a high heat resistance, an excellent thermal shock resistance and a high moisture resistance (Patent document 4); and a resin composition containing an epoxy resin, a cyanate ester resin, an adduct of an imidazole compound with an epoxy resin, and a metallic curing catalyst as an essential component, and has a low coefficient of thermal expansion, and can form a uniform roughened surface having a low roughness degree and also has excellent adhesive properties to a conductive layer formed on the said roughened surface (Patent document 5).

Moreover, there was disclosed an epoxy resin composition having a high flame retardancy, a high solder crack resistance and a superior in fluidity as well as little warpage, containing at least one epoxy resin selected from the trifunctional epoxy resins and the tetrafunctional epoxy resins, a curing agent having at least two groups which react with an epoxy group within a molecule, a compound having at least two cyanato groups within a molecule and an inorganic filler, as an essential component (Patent document 6).

In addition, there were disclosed an insulating sheet containing a polymer having 10,000 or more of weight-average molecular weight, a curable compound having an epoxy group or an oxetane group, a cyanate compound having 50 to 200 of cyanate equivalent, a curing agent and a filler, and has high handling properties in the uncured state and can obtain a cured material having a low relative dielectric constant (Patent document 7); and a solventless one liquid type cyanic acid-epoxy composite resin composition containing a polyfunctional cyanic acid ester having 2.5 or more of average number of cyanato group or a mixture thereof, a liquid polyfunctional epoxy resin having 2.5 or more of average number of epoxy group or a mixture thereof, and an amine latent curing agent, and has a curability, a heat resistance, a low permittivity and a low dielectric tangent (Patent document 8).

However, these prior arts could not satisfy sufficiently all characteristics required in the coating process or sheet forming process, such as coating properties, a flexibility, and a heat resistance of a cured material.

PRIOR ART DOCUMENTS

Patent Document

Patent document 1: Japanese Unexamined Patent Publication Tokkai 2000-7763
Patent document 2: Japanese Unexamined Patent Publication Tokkai 2003-253018
Patent document 3: Japanese Unexamined Patent Publication Tokkai 2004-359853
Patent document 4: Japanese Unexamined Patent Publication Tokkai 2007-197706
Patent document 5: Japanese Unexamined Patent Publication Tokkai 2010-90236
Patent document 6: International Publication 2007/037500 brochure
Patent document 7: Japanese Unexamined Patent Publication Tokkai 2011-124075
Patent document 8: Japanese Unexamined Patent Publication Tokkai 2011-162710

DISCLOSURE OF INVENTION

Problems to be Solved by the Invention

Therefore, the first object of the present invention is to provide a curable resin composition which has excellent coating properties, low tacky properties, flexibility of coated resin film before curing, and adhesive properties to base material after curing as well as a high heat resistance and superior insulating properties.

The second object of the present invention is to provide a resin composition which has an excellent heat dissipation properties as well as the excellent coating properties, low tacky properties, an excellent flexibility of coated resin film before curing and excellent adhesive properties to base material after curing along with a high heat resistance and an excellent insulating properties.

The third object of the present invention is to provide a resin sheet which has a high heat resistance and superior insulating properties as well as the low tacky properties, excellent flexibility of coated resin film before curing and excellent adhesive properties to base material after curing.

The fourth object of the present invention is to provide a cured material which has excellent adhesive properties to base material, a high heat resistance and excellent insulating properties etc.

Means for Solving the Problems

As a result of intensive studies for attaining above objects, the inventors of the present invention have found that said objects could be attained by combining a polyfunctional epoxy compound having a specific structure, a polyfunctional cyanic acid ester and a curing agent comprising an imidazole compound, thereby achieving the present invention.

Namely, the present invention is a curable resin composition which contains (A), (B) and (C) as follows: (A) 100 parts by mass of polyfunctional epoxy component which contains (A1) a trifunctional epoxy compound having three glycidyl groups in a molecule and (A2) a tetrafunctional epoxy compound having four glycidyl groups in a molecule, wherein (A1):(A2) is 10:90 to 90:10 in terms of mass; (B) 25 to 200 parts by mass of polyfunctional cyanic acid ester compound having two or more of cyanato groups; and (C) 0.5 to 20 parts by mass of an imidazole compound as a curing agent; wherein said trifunctional epoxy compound (A1) is an epoxy compound which has an aromatic hydrocarbon moiety having one or more aromatic rings which are unsubstituted or substituted by halogen atoms, wherein no methylene groups are contained but may contain an ether bond between carbon-carbon atoms, wherein three glycidyloxy groups or one glycidyloxy group and one diglycidylamino group are bonded to said aromatic ring(s); and said tetrafunctional epoxy compound (A2) is an epoxy compound which has an aromatic hydrocarbon moiety having one or more aromatic rings which are unsubstituted or substituted by halogen atoms, wherein no methylene groups are contained but may contain an ether bond between carbon-carbon atoms, and at least one kind of group selected from the glycidyloxy group and the diglycidyl amino group is bonded to said aromatic ring(s); a resin composition comprising a noncurable component and a curable component consisting of said curable resin composition wherein the content ratio of said curable component is 5 to 99 percent by mass; a resin sheet using said curable resin composition or said resin composition; and a cured material obtained by curing these.

In the curable resin composition of the present invention, it is preferable that at least one of the trifunctional epoxy compound (A1) and tetrafunctional epoxy compound (A2) is a compound having an aromatic ring to which the diglycidyl amino group is bonded, and it is further preferable that said trifunctional epoxy compound (A1) is an epoxy compound having an aromatic ring to which the diglycidyl amino group is bonded.

In addition, in cases where the curable resin composition of the present invention is coated or bonded to an inorganic base material, or in cases where the filler (E) is used as a noncurable component for the resin composition, it is preferable that 1 to 25 parts by mass of the silane coupling agent (D) is further contained.

Furthermore, in cases where a thermal conductivity and flame resistant properties etc. are imparted to a cured material obtained by curing a curable resin composition of the present invention, or in order to suppress a thermal expansion of the cured material, it is preferable to blend the filler (E) as a noncurable component.

Effect of the Invention

The curable resin composition of the present invention has not only excellent coating properties, low tacky properties and a superior flexibility of coated resin film before curing, but also has excellent adhesive properties to a base material, a high heat resistance and excellent insulating properties, after curing. Also, the resin composition of the present invention has not only excellent coating properties, low tacky properties and a superior flexibility of coated resin film before curing, but also has excellent adhesive properties to a base material, a high heat resistance and excellent insulating properties, after curing, in the same way as said curable resin composition, and further has excellent heat dissipation properties.

MODES FOR CARRYING OUT THE INVENTION

The curable resin composition of the present invention contains a polyfunctional epoxy component (A), a polyfunctional cyanic acid ester component (B) and a curing agent (C).

The above polyfunctional epoxy component (A) is comprised of one or more of trifunctional epoxy compound (A1) having three glycidyl groups in a molecule, and one or more of tetrafunctional epoxy compound (A2) having four glycidyl groups in a molecule.

The trifunctional epoxy compound (A1) is an epoxy compound which has an aromatic hydrocarbon moiety having one or more aromatic rings which are unsubstituted or substituted by halogen atoms, wherein no methylene groups are contained but may contain an ether bond between carbon-carbon atoms, wherein three glycidyloxy groups, or one glycidyloxy group and one diglycidylamino group are bonded to said aromatic ring(s), and it is preferable to be a compound having a structure represented by the following general formula (1):

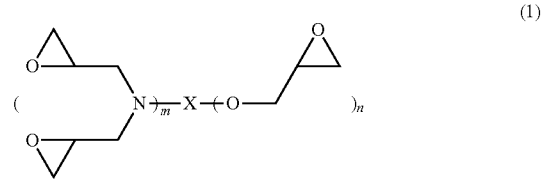

wherein, X is an aromatic hydrocarbon moiety having 1 to 4 aromatic rings, which may be unsubstituted or may be substituted by halogen atoms such as fluorine, chlorine, bromine and iodine, having no methylene group but may has an ether bond between carbon-carbon atoms.

In the formula, the diglycidyl amino group and the glycidyloxy group are directly bonded to the aromatic ring, m being 0 or 1 and n being an integer of 3-2 m.

The aromatic hydrocarbon moiety X is an aromatic ring alone selected from benzene, naphthalene, biphenyl, anthracene, fluorene, acenaphthylene and acenaphthene, or consists of said aromatic ring and at least one group selected from a methyl group, a methine group, a carbon atom and an oxygen atom.

A more specific example of trifunctional epoxy compound (A1) is a compound represented by the following general formula (1-1):

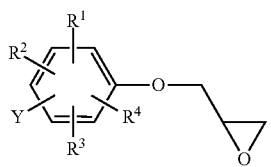
(1-1)

wherein, $R^1$ to $R^4$ are each, independently, a hydrogen atom, a halogen atom or a methyl group, and Y is a group selected from the following general formulae from (1-2) to (1-4):

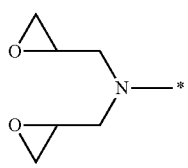
(1-2)

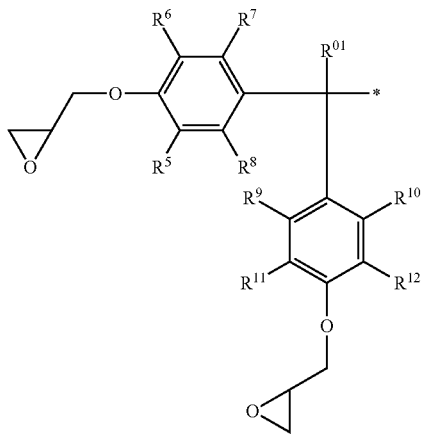
(1-3)

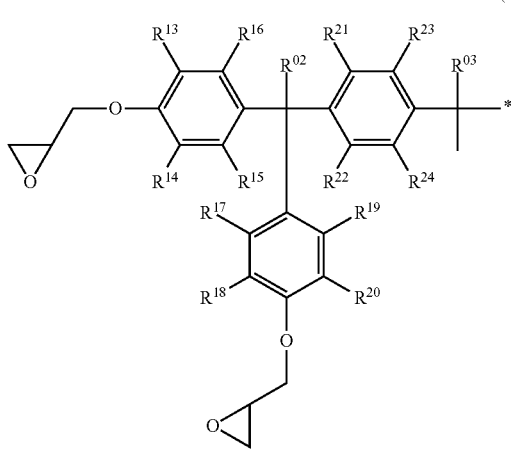
(1-4)

wherein, $R^5$ to $R^{24}$ are each, independently, a hydrogen atom, a halogen atom or a methyl group, and $R^{01}$ to $R^{03}$ are each, independently, a hydrogen atom or a methyl group. Also, the halogen atom may be any of fluorine, chlorine, bromine and iodine.

In the formula, * represents a bonding part.

More specific examples of trifunctional epoxy compound (A1) used for the present invention are compounds from a-1 to a-7 as indicated below.

Compound a-1

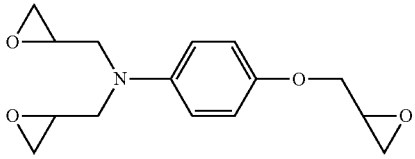

Compound a-2

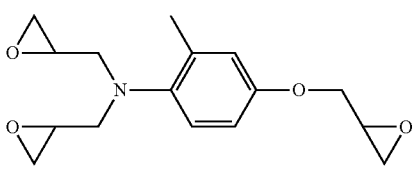

Compound a-3

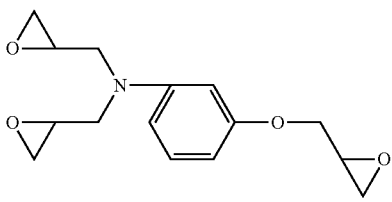

Compound a-4

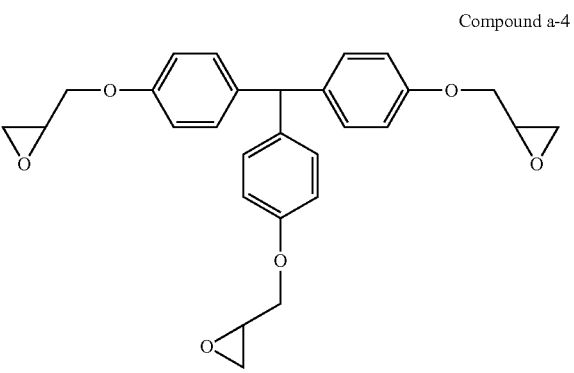

Compound a-5

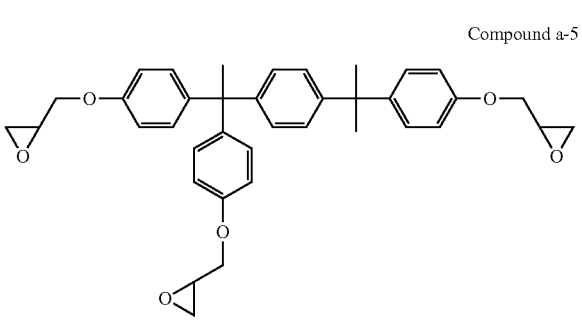

-continued

Compound a-6

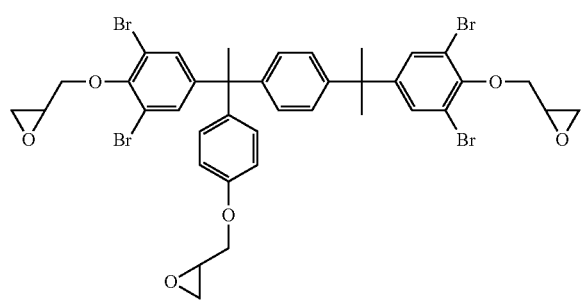

Compound a-7

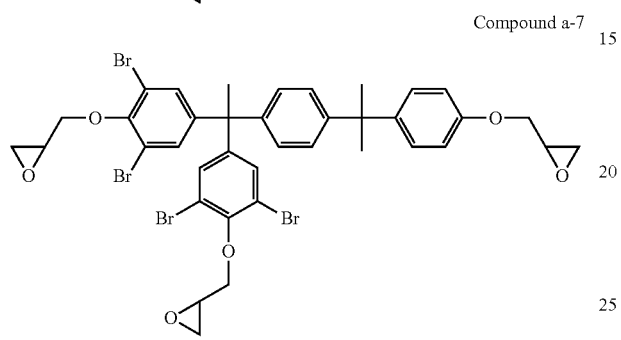

The tetrafunctional epoxy compound (A2) is an epoxy compound which has an aromatic hydrocarbon moiety having one or more aromatic rings which are unsubstituted or substituted by halogen atoms, wherein no methylene groups are contained but may contain an ether bond between carbon-carbon atoms, and at least one group selected from the glycidyloxy group and the digilycidyl amino group is bonded to said aromatic ring(s). For example, it is preferable to be a compound having a structure represented by the following general formula (2):

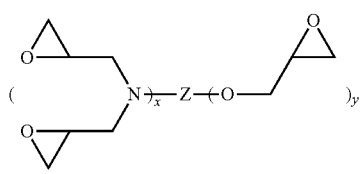
(2)

wherein, Z is an aromatic hydrocarbon moiety having no methylene group between carbon-carbon atoms, and has 2 to 6 aromatic rings which may be unsubstituted or substituted by halogen atoms such as fluorine, chlorine, bromine and iodine, and may have an ether bond. In addition, in the formula, the diglycidyl amino group and the glycidyloxy group are directly bonded to the aromatic rings, x is 0, 1 or 2, y is an integer of 4-2x.

Namely, said tetrafunctional epoxy compound (A2) is any of the followings: compound having 4 glycidyloxy groups, compound having one diglycidyl amino group and two glycidyloxy groups, or compound having two diglycidyl amino groups.

The aromatic hydrocarbon moiety Z is an aromatic ring alone selected from benzene, naphthalene, biphenyl, anthracene, fluorene, acenaphthylene and acenaphthene, or consists of said aromatic ring and at least one group selected from a methyl group, a methine group, a carbon atom and an oxygen atom.

More specific examples of tetrafunctional epoxy compound (A2) used for the present invention are compounds represented by the following general formulae from (2-1) to (2-3):

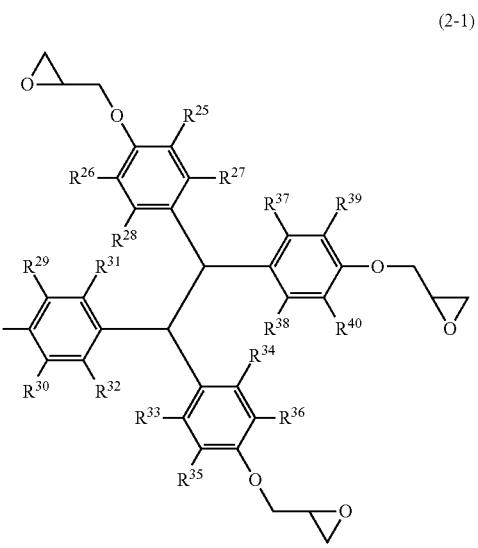
(2-1)

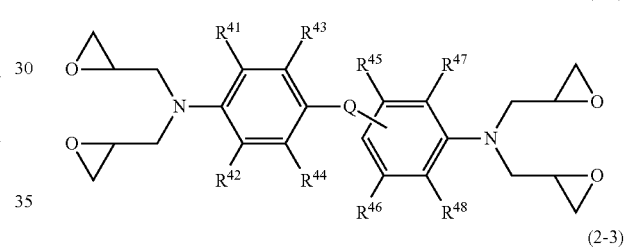
(2-2)

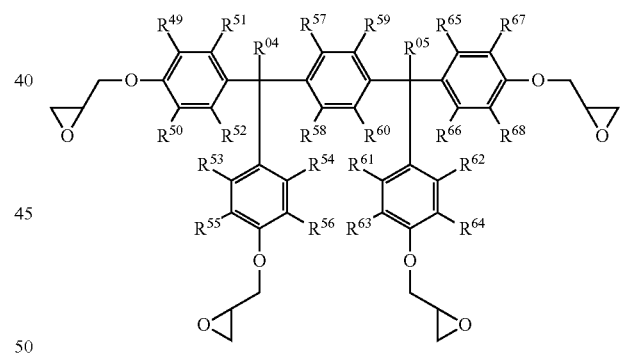
(2-3)

wherein, $R^{25}$ to $R^{68}$ are each, independently, a hydrogen atom, a halogen atom or a methyl group, $R^{04}$ and $R^{05}$ are each, independently, a hydrogen atom or a methyl group, and Q is an oxygen atom or a group represented by the following general formula (2-4):

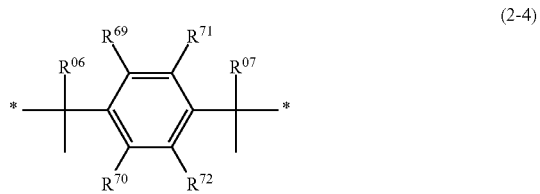
(2-4)

wherein, $R^{69}$ to $R^{72}$ are each, independently, a hydrogen atom, a halogen atom or a methyl group, $R^{06}$ and $R^{07}$ are each, independently, a hydrogen atom or a methyl group. In the formula, * represents a bonding part.

Preferable examples of said tetrafunctional epoxy compound (A2) in the present invention are compounds represented by the following compounds from a-8 to a-12.

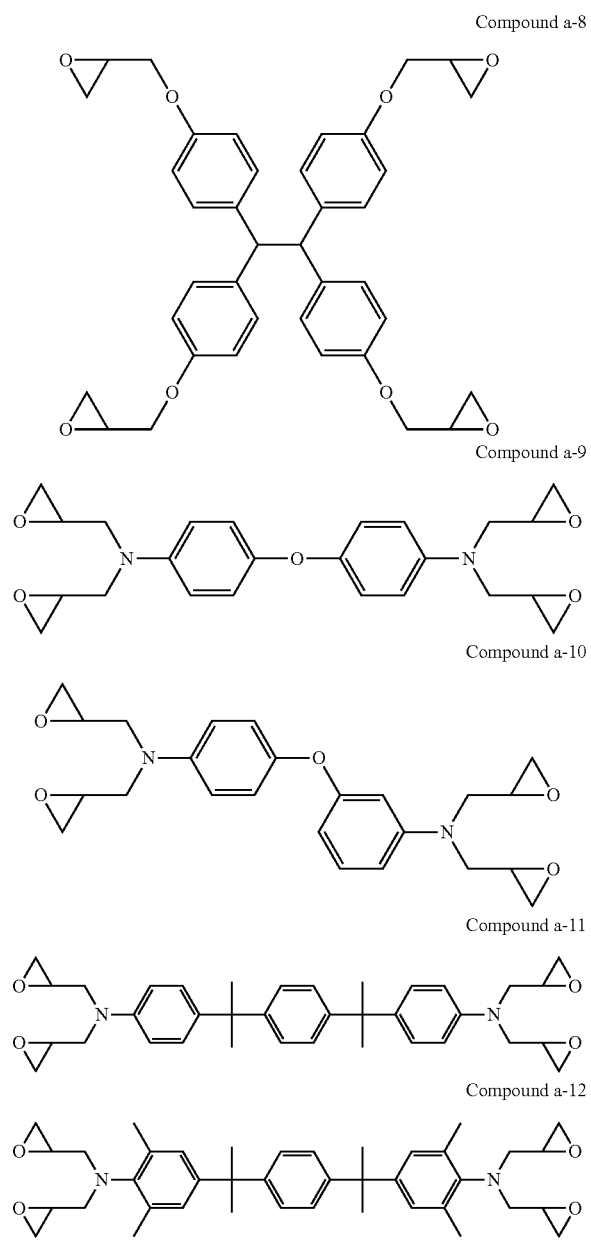

Compound a-8

Compound a-9

Compound a-10

Compound a-11

Compound a-12

The polyfunctional epoxy component (A) can improve the heat resistance of the cured material obtained from the curable resin composition in the present invention.

In addition, in the present invention, from the viewpoints of imparting the flexibility to the resin film after coated but before curing and improving the strength of cured resin material, it is preferable that at least one compound selected from the trifunctional epoxy compound (A1) and tetrafunctional epoxy compound (A2) is a compound having an aromatic ring wherein a diglycidyl amino group is bonded to the ring.

Furthermore, in the present invention, from the viewpoints of maintaining excellent coating properties and reducing tacky properties of resin film after coated but before curing, it is preferable to select the trifunctional epoxy compound (A1) and tetrafunctional epoxy compound (A2) so that one of them is a liquid compound having fluidity, and another compound is a solid compound having no fluidity and combine them.

In this case, it is preferable that the trifunctional epoxy compound (A1) having the diglycidyl amino group, which can impart the flexibility to the coated resin film, and the tetrafunctional epoxy compound (A2), which is able to produce a cured material having a higher heat resistance, are combined together.

Since the resin sheets are manufactured and commercialized in an overlapped state, it is required that coated resin film has no tacky properties. In this case also, it is preferable to select (A1) and (A2) so that one compound of trifunctional epoxy compound (A1) and tetrafunctional epoxy compound (A2) is solid and another compound is liquid.

For example, in cases of above-mentioned exemplary compounds from a-1 to a-12, it is the compound a-8 that can provide a cured material with a high heat resistance after curing. Since the compound a-8 is a solid compound, when resin sheets are formed, it is preferable to select at least one trifunctional epoxy compound, which is combined with the compound a-8, from liquid compounds a-1, a-2 and a-3 which have a diglycidyl amino group.

The content ratio of trifunctional epoxy compound (A1) in the polyfunctional epoxy component (A) of the present invention is within the range from 10 to 90% by mass, from the viewpoint of imparting a sufficient heat resistance to the cured material.

When a solid epoxy compound and a liquid epoxy compound are used together, in order to satisfy both of excellent coating properties and reduced tacky properties, it is preferable that the content ratio of the liquid epoxy compound in the component (A) is within the range from 20 to 80% by mass.

For example, in cases where said compound a-8 is combined with at least one kind of compound selected from compounds a-1, a-2 and a-3, coating properties, a flexibility of coated resin film and a heat resistance of cured material become excellent when the content ratio of the compound a-8 in the component (A) is within the range from 30 to 70% by mass.

A polyfunctional cyanic acid ester (B) used in the present invention is not limited in particular. For example, at least one compound selected from a group consisting of compounds represented by the following general formulae (3) and (4) can be used.

In addition, compounds wherein a part of or most of cyanato groups contained in these compounds are trimerized to form a triazine ring can be also used.

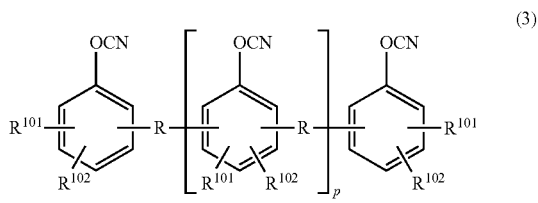

(3)

wherein, p is an integer from 0 to 12, R is a bivalent hydrocarbon group which is unsubstituted or substituted by a halogen atom, $R^{101}$ and $R^{102}$ are each, independently, a hydrogen atom or an alkyl group having 1 to 4 carbon atoms.

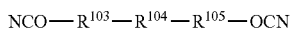
(4)

wherein, $R^{104}$ is a bivalent hydrocarbon group which is unsubstituted or substituted by a halogen atom, —O—, —S— or a single bond, $R^{103}$ and $R^{105}$ are each, independently, a phenylene group which is unsubstituted or substituted by 1 to 4 alkyl groups having 1 to 4 carbon atoms.

An example of R in the general formula (3) is a group selected from the following group (3-1).

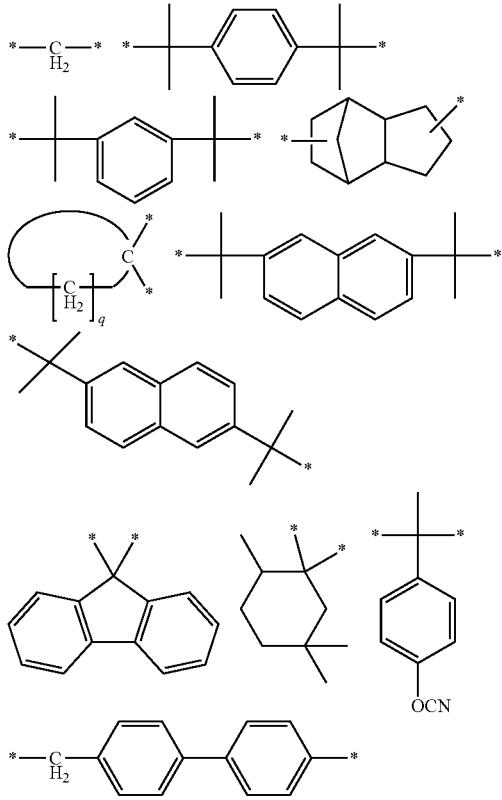
(3-1)

wherein, q is an integer from 4 to 12.

Examples of $R^{104}$ in said general formula (4) are propane-2,2-diyl groups which is unsubstituted or substituted by a halogen atom, or a group selected from the following group (4-1).

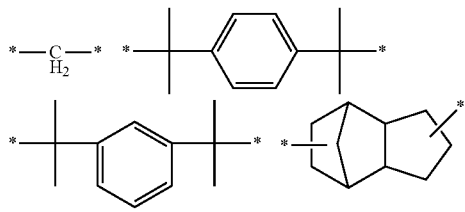
(4-1)

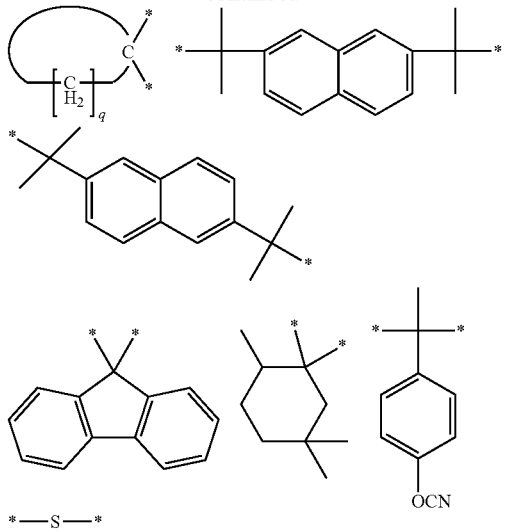

wherein, q is an integer from 4 to 12.

An example of $R^{103}$ and $R^{105}$ is a group represented by the following general formula (4-2).

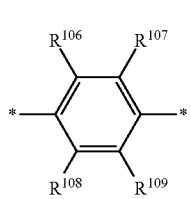
(4-2)

wherein, $R^{106}$ to $R^{109}$ are each, independently, a hydrogen atom, a methyl group which is unsubstituted or substituted by a halogen atom.

In this regard, * in said (3-1), (4-1) and (4-2) represents a bonding part.

Specific examples of polyfunctional cyanic acid ester compounds used as the polyfunctional cyanic acid ester component (B) used for the present invention are phenol novolac polycyanate, cresol novolac polycyanate, 4,4'-ethylidene bis phenylene cyanate and 2,2-bis(4-cyanatophenyl) propane. Above all, phenol novolac polycyanate is desirable since it is not only inexpensive but also is able to adjust coating properties of a resin composition easily, and as a result, insulating properties of obtained cured material become excellent.

By using before mentioned polyfunctional cyanic acid ester (B), an effect, that insulating properties of the cured material produced by curing the curable resin composition of the present invention are improved, can be obtained.

Furthermore, from the viewpoint of improving the applying properties of curable resin composition, it is preferable that the polyfunctional cyanic acid ester component (B) is a liquid having fluidity. For example, the phenol novolac polycyanate, which is liquid in the temperature range from 20° C. to 60° C., is preferably used.

The curing agent (C) used for the present invention is at least one compound selected from the imidazole compounds.

Examples of said imidazole compounds are 2-methylimidazole, 2-undecylimidazole, 2-heptadecylimidazole, 1,2-dimethylimidazole, 2-ethyl-4-methylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2-4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'ethyl-4'methylimidazolyl-(1')]-ethyl-s-triazine, 2,4-diamino-6-[2'-methylimidazolyl-(1')]-ethyl-s-triazine isocyanuric acid addition product, 2-phenylimidazole isocyanuric acid addition product, 2-phenyl-4,5-dihydroxymethyl imidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline and 2-phenylimidazoline.

In the present invention, according to a constitution of the curable resin composition or a use of the resin sheet of the present invention, an appropriate compound is selected from before mentioned imidazole compounds in order to realize a suitable curing temperature and curing speed.

For example, in cases where a resin sheet is manufactured by using the component (A) comprising at least one kind of trifunctional epoxy compound selected from the compounds a-1, a-2 and a-3, and the tetrafunctional epoxy compound a-8, with the polyfunctional cyanic acid ester component (B) comprising phenol novolac polycyanate, it is preferable to use 2-phenyl-4,5-dihydroxymethylimidazole since this compound can be used at relatively high curing temperature and a composition having a long pot life can be obtained.

In order to improve the adhesive properties of the cured resin, obtained by curing the curable resin composition of the present invention, to an inorganic base material, or in order to improve the strength of the coated resin film after curing which is obtained from the resin composition further containing a filler after-mentioned, it is preferable to further blend the silane coupling agent (D) into the composition.

Said silane coupling agent is not limited in particular as long as it is a silicon compound having a functional group which reacts with an organic component, and also having a functional group which reacts with a base material or a filler. It can be selected as appropriate from well known ones.

As a silane coupling agent which can be blended into the curable resin composition of the present invention, it is preferable to use the silane coupling agent having an epoxy group, an amino group, an isocyanato group and a mercapto group etc., which can react with said components (A) and/or (B). Also, it is preferable to use the silane coupling agent having a silanol group and an alkoxy silyl group etc., which can react with a base material or a filler, Examples of the silane coupling agent which can be used as said component (D) are 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-isocyanatopropyltriethoxysilane, 3-isocyanatopropyltrimethoxysilane, 3-mercaptopropyltrimethoxysilane and 3-mercaptopropylmethyldimethoxysilane.

As for the blending ratio of the polyfunctional epoxy component (A) and the polyfunctional cyanic acid ester component (B) in the curable resin composition of the present invention, from the viewpoint of providing the cured material with a sufficient heat resistance and necessary insulating properties, it is required that the component (B) is 25 to 200 parts by mass relative to 100 parts by mass of the component (A), and 50 to 150 parts by mass are preferable. When the component (B) is less than 25 parts by mass, the heat resistance of the cured material is insufficient. When it is more than 200 parts by mass, adhesive properties to a base material are lowered.

In addition, as for the blending ratio of the polyfunctional epoxy component (A) and the curing agent (C), from the viewpoints of obtaining a stable curing condition and a sufficient curing speed, it is required that the curing agent (C) is 0.5 to 20 parts by mass relative to 100 parts by mass of the component (A), and 0.8 to 10 parts by mass are preferable. When the curing agent (C) is less than 0.5 parts by mass, the curing speed of the composition is delayed. When it is more than 20 parts by mass, insulating properties of cured material are lowered due to being affected by the excess curing agent.

As for the blending ratio of the silane coupling agent, when the silane coupling agent (D) is used, it is required that the silane coupling agent (D) is 1 to 25 parts by mass relative to 100 parts by mass of the polyfunctional epoxy component (A), and 3 to 10 parts by mass are more preferable. When the silane coupling agent (D) is less than 1 part by mass, adhesive properties of the cured material to base materials are sometimes insufficient. When it is more than 25 parts by mass, insulating properties of cured material are lowered due to being affected by the excess silane coupling agent.

The curable resin composition of the present invention can be widely applied as a resin base material of various members in Electrical and Electronic fields, such as a printed wiring board, an insulating material for sealing a semiconductor, a power semiconductor, a LED illumination, a LED back light, a power LED and a solar battery. Specifically, the curable resin composition of the present invention is useful as a curable component for a prepreg, a sealing agent, a laminated substrate, an adhesive agent which is able to coat and an adhesive sheet, or as a curable component of various coating materials.

The resin composition of the present invention is comprised of the curable component consisting of the curable resin composition of the present invention, and a non-curable component, wherein the content rate of said curable component is 5 to 99% by mass. Such resin composition as above is favorably applicable to wider uses.

The term "non-curable component" here means as follows: a component which does not contribute to a curing reaction of the curable resin composition of the present invention; a component which does not substantially contribute to the above curing reaction even if it contains a part which is able to react; or a component which is hardly affected by said curing reaction, even if it contains a part which is able to react. This non-curable component is selected and blended as appropriate, according to respective purposes such as improving coating properties of curable resin composition of the present invention, imparting a thermal conductivity to the cured material, imparting a burning resistance and flame retardancy to the cured material, imparting insulating properties to the cured material, imparting a mechanical strength to the cured material and inhibiting a thermal expansion of the cured material of curable resin composition of the present invention.

When a thermoplastic resins is used as the non-curable component, coating properties of resin composition are improved. Therefore, not only a split phenomenon of coating film to be coated, which may occur in the coating step, and the phenomena of break and crack of coated resin film are prevented, but also a flexibility and a ductility of coated resin film obtained by coating are improved.

A thermoplastic resins having a part which is able to react with the curable resin composition of the present invention can be used in the present invention as long as the said part does not substantially contribute to the resin curing reaction, or said part is hardly affected by the resin curing reaction.

Examples of said thermoplastic resins are polyolefin resins and copolymers thereof such as an α-olefin polymer like low-density polyethylene, linear low-density polyethylene, high-density polyethylene, polypropylene, polybutene-1, poly 3-methyl-1-butene, poly 3-methyl-1-pentene and poly 4-methyl-1-penten or an ethylene-vinyl acetate copolymer, and an ethylene/propylene block copolymer or a random copolymer; halogen-containing resins such as polyvinyl chloride, polyvinylidene chloride, chlorinated polyethylene, polyvinylidene fluoride, chlorinated rubber, a vinyl chloride-vinyl acetate copolymer, a vinyl chloride-ethylene copolymer, a vinyl chloride-vinylidene chloride-vinyl acetate ternary copolymer, a vinyl chloride-acrylic acid ester copolymer, a vinyl chloride-maleic acid ester copolymer and a vinyl chloride-cyclohexyl maleimide copolymer; polyester resins such as polyethylene terephthalate (PET), polybutylene terephthalate (PBT) and polyhexamethylene terephthalate; styrene resins such as polystyrene, high-impact polystyrene (HIPS), acrylonitrile butadiene styrene (ABS), polyethylene chloride acrylonitrile styrene (ACS), styrene acrylonitrile (SAN), acrylonitrile butyl acrylate styrene (AAS), butadiene styrene, styrene maleic acid, styrene maleimide, acrylonitrile ethylene-propylene-diene styrene (AES) and butadiene methyl methacrylate styrene; polycarbonate resins such as polycarbonate and branched polycarbonate; polyamide resins such as polyhexamethylene adipamide (nylon 66) and polycaprolactam (nylon 6); polyphenylene oxide (PPO) resin, polyphenylene sulfone (PPS) resin, polyacetal (POM), polyalkylene ether resin, phenoxy resin, petroleum resin, coumarone resin, polyvinyl acetate resin, acrylic resin and polymer alloy of polycarbonate with styrene resin. These are used alone, or more than two kinds of them are used by mixture.

It is preferable to use the phenoxy resin among said thermoplastic resins in the present invention, since it has an excellent compatibility with the curable resin composition of the present invention, and not only it can impart a flexibility to a coated resin film before curing but also the cured material thereof after cured has an excellent heat resistance and insulating properties. It is preferable that the content ratio of phenoxy resin is 0.5 to 20% by mass in the resin composition of the present invention.

In order to impart the properties such as a thermal conductivity, a burning resistance, a flame retardancy, insulating properties and a mechanical strength to the cured material of resin composition of the present invention, and in order to inhibit a thermal expansion of the cured material, it is preferable to blend a filler as a non-curable component (E).

Examples of the filler are silicate salts such as talc, baked clay, unbaked clay, mica and glass; oxidation products such as titanium oxide, alumina, silica, molten silica, magnesium oxide and zirconium oxide; carbonates such as calcium carbonate, magnesium carbonate and hydrotalcite; metallic hydroxides such as aluminum hydroxide, magnesium hydroxide and calcium hydroxide; sulfates or sulfites such as barium sulfate, calcium sulfate and calcium sulfite; borates such as zinc borate, barium metaborate, aluminum borate, calcium borate and sodium borate; nitrides such as aluminum nitride, boron nitride, silicon nitride and carbon nitride; fibrous fillers such as glass fiber and carbon fiber; titanates such as calcium titanate, strontium titanate, barium titanate, lead titanate and lead zirconate titanate, and also cellulose, silica sand, cement and carbon.

These are used alone, or more than two kinds of them are used by mixture, if needed.

These fillers are selected as appropriate according to an intended purpose or use. For example, in order to impart a thermal conductivity, it is preferable to use alumina, aluminum nitride and boron nitride. In order to inhibit a thermal expansibility and impart insulating properties, it is preferable to use silica, in particular spherical molten silica. In order to impart a burning resistance and a flame retardancy etc., it is preferable to use aluminum hydroxide etc.

A particle size, a particle size distribution and a shape of fillers may be selected as appropriate so as to obtain a desired use effect. The content ratio of filler contained in the entire resin composition can be adjusted as appropriate, and generally 50 to 95% by mass is preferable.

In order to improve coating properties, both of the curable resin composition and resin composition of the present invention can contain an organic solvent, a thermoplastic resin, a thixotropic agent, a viscosity modifier and a leveling agent etc.

It is preferable that the above organic solvent is the one, which can maintain the curable resin composition or the resin composition of the present invention in the stable mixed state and volatilizes at a proper temperature. Examples of these organic solvents are alcohol solvents, diol solvents, ketonic solvents, ester solvents, ether solvents, aliphatic or alicyclic hydrocarbon solvents, aromatic hydrocarbon solvents and halogenated aromatic hydrocarbon solvents. These are used alone or more than two kinds of them are used by mixture.

Examples of the above alcohol solvents are methanol, ethanol, propanol, isopropanol, 1-butanol, isobutanol, 2-butanol, tertiary butanol, pentanol, isopentanol, 2-pentanol, neopentanol, tertiary pentanol, hexanol, 2-hexanol, heptanol, 2-heptanol, octanol, 2-ethylhexanol, 2-octanol, cyclopentanol, cyclohexanol, cycloheptanol, methylcyclopentanol, methyl cyclohexanol, methylcyclo heptanol, benzyl alcohol, ethylene glycol monomethyl ether, ethylene glycol monoethyl ether, propylene glycol monomethyl ether, propylene glycol monoethyl ether, diethylene glycol monomethyl ether, diethylene glycol monoethyl ether, triethylene glycol monomethyl ether, triethylene glycol monoethyl ether, 2-(N,N-dimethylamino) ethanol and 3(N,N-dimethylamino) propanol.

Examples of said diol solvents are ethylene glycol, propylene glycol, 1,2-butanediol, 1,3-butanediol, 1,4-butanediol, 1,5-pentanediol, neopentyl glycol, isoprene glycol(3-methyl-1,3-butanediol), 1,2-hexanediol, 1,6-hexanediol, 3-methyl-1,5-pentandiol, 1,2-octanediol, octanediol, (2-ethyl-1,3-hexanediol), 2-butyl-2-ethyl-1,3-propanediol, 2,5-dimethyl-2,5-hexanediol, 1,2-cyclohexanediol, 1,4-cyclohexanediol and 1,4-cyclohexanedimethanol.

Examples of said ketonic solvents are acetone, ethyl methyl ketone, methyl isopropyl ketone, methyl butyl ketone, methyl isobutyl ketone, methyl amyl ketone, methyl hexyl ketone, ethyl butyl ketone, diethyl ketone, dipropyl ketone, diisobutyl ketone, methyl amyl ketone, cyclohexanone and methyl cyclohexanone.

Examples of said ester solvents are methyl formate, ethyl formate, methyl acetate, ethyl acetate, isopropyl acetate, butyl acetate, isobutyl acetate, secondary butyl acetate, tertiary butyl acetate, amyl acetate, isoamyl acetate, tertiary amyl acetate, phenyl acetate, methyl propionate, ethyl propionate, isopropyl propionate, butyl propionate, isobutyl propionate, secondary butyl propionate, tertiary butyl propionate, amyl propionate, isoamyl propionate, tertiary amyl propionate, phenyl propionate, methyl 2-ethylhexanoate, ethyl 2-ethylhexanoate, propyl 2-ethylhexanoate, isopropyl 2-ethylhexanoate, butyl 2-ethylhexnoate, metyl lactate, ethyl lactate, methyl methoxypropionate, methyl ethoxy propionate, ethyl methoxy propionate, ethyl ethoxy propionate, ethylene glycol monomethyl ether acetate, diethylene glycol monomethyl ether acetate, ethylene glycol monoethyl ether acetate, ethylene glycol monopropyl ether acetate, ethylene glycol monoisopropyl ether acetate, ethylene glycol monobutyl ether acetate, ethylene glycol monosecondary butyl ether acetate, ethylene glycol monoisobutyl ether acetate, ethylene glycol monotertiary butyl ether acetate, propylene glycol monomethyl ether acetate, propylene glycol monoethyl ether acetate, propylene glycol monopropyl ether acetate, propylene glycol monoisopropyl ether acetate, propylene glycol monobutyl ether acetate, propylene glycol monosecondary butyl ether acetate, propylene glycol monoisobutyl ether acetate, propylene glycol monotertiary butyl ether acetate, butylene glycol monomethyl ether acetate, butylene glycol monoethyl ether acetate, butylene glycol monopropyl ether acetate, butylene glycol monoisopropyl ether acetate, butylene glycol monobutyl ether acetate, butylene glycol monosecondary butyl ether acetate, butylene glycol monoisobutyl ether acetate, butylene glycol monotertiary butyl ether acetate, methyl acetoacetate, ethyl acetoacetate, methyl oxobutanoate, ethyl oxobutanoate, γ-lactone, dimethyl malonate, dimethyl succinate, propylene glycol diacetate and δ-lactone.

Examples of said ether solvents are tetrahydrofuran, tetrahydropyran, morpholine, ethylene glycol dimethyl ether, diethylene glycol dimethyl ether, dipropylene glycol dimethyl ether, triethylene glycol dimethyl ether, dibutyl ether, diethylether and dioxane.

Examples of said aliphatic or alicyclic hydrocarbon solvents are pentane, hexane, cyclohexane, methyl cyclohexane, dimethyl cyclohexane, ethyl cyclohexane, heptane, octane, decalin, solvent naphtha, turpentine oil, D-limonene, pinene and mineral sprits.

Examples of said aromatic hydrocarbon solvents are benzene, toluene, ethyl benzene, xylene, mesitylene, diethyl benzene, cumene, isobutyl benzene, cymene and tetralin. Examples of halogenated hydrocarbon solvents are carbon tetrachloride, chloroform, trichloroethylene and methylene chloride.

In these organic solvents, from the viewpoints that it is easy to volatilize after forming the resin sheet and the solubility of resin component is high, it is preferable in the present invention to use the alcohol solvents, ketonic solvents, aliphatic hydrocarbon solvents and aromatic hydrocarbon solvents. It is preferable that the content ratio of these solvents is 10 to 50% by mass in the curable resin composition or resin composition of the present invention.

The resin composition of the present invention can be widely applied as a resin base material of various members in Electrical and Electronic fields such as a printed wiring board, an insulating material for sealing a semiconductor, a power semiconductor, a LED illumination, a LED back light, a power LED and a solar battery.

Specifically, the resin composition of the present invention is useful as a prepreg, a sealing agent, a laminated substrate, a coatable adhesive agent, an adhesive sheet and various coating materials.

The resin sheet of the present invention is obtained by further blending the curable resin composition or resin composition of the present invention with solvents, if needed, and then by coating the blended mixture on the support media such as a carrier film or a metallic foil.

The resin sheet of the present invention may be in the state wherein the solvent is left or may be in the state wherein the solvent is not contained by volatilizing the solvent after the sheet is formed.

The method for manufacturing the resin sheet of the present invention is not limited in particular. Well-known methods can be used. Specifically, the resin composition may be coated on the supporting media by using various coating apparatuses or may be coated on the supporting media by using a spray apparatus.

Examples of method for coating are methods using coating apparatuses such as a roll coater, a bar coater, a knife coater, a gravure coater, a die coater, a comma coater and a curtain coater, and methods such as screen printing and brush coating.

In cases where the resin sheet is used after releasing the supporting media such as carrier film etc. from the resin coated supporting media, it is preferable that the release is easy. As such a supporting media, it is preferable to use a thermoplastic resin film having a thermal resistance such as a polyester resin like polyethylene terephthalate and polybutylene terephthalate, a fluorinated resin and a polyimide resin.

When a metallic foil is used as a support medium, the metallic foil can be selected depending on usage. Examples of the composition of metallic foil are copper, copper alloy, aluminum, aluminum alloy, iron, iron alloy, silver, silver alloy, gold, gold alloy, zinc, zinc alloy, nickel, nickel alloy, tin and tin alloy. These are preferably selected. An ultrathin metallic foil having carrier foil may be used as a metallic foil.

The thickness of resin sheet of the present invention is commonly 20 to 150 μm and can be set as appropriate according to an intended purpose.

When the resin sheet of the present invention is used as an adhesive sheet having heat dissipation properties to fix a heat-generating device such as a semiconductor device, a LED illumination, a LED backlight and a power LED, it is required that not only the resin composition has an excellent coating properties, but also the coated resin film has an excellent flexibility with no tacky adhesion. In addition, it is required that a cured material has an excellent heat resistance and excellent insulating properties.

In this case, it is preferable to use a compound, wherein a diglycidyl amino group is bonded to an aromatic ring, as a trifunctional epoxy compound (A1), and to use a compound having an excellent heat resistance like aforementioned compound a-8, as a tetrafunctional epoxy compound (A2) in the epoxy component (A). Furthermore, from the viewpoints of coating properties and insulating properties, it is preferable to use a liquid phenol novolac polycyanate as a polyfunctional cyanic acid ester (B). As a curing agent (C), it is preferable to use a 2-phenyl-4,5-dihydroxymethylimidazole having a high curing temperature.

As a filler (E) that imparts a thermal conductivity to a cured material, it is preferable to use at least one of fillers selected from alumina, aluminum nitride and boron nitride. Also, it is possible to add further a silane coupling agent component (D), an organic solvent, a thermoplastic resin and a leveling agent, if needed.

This invention will now be described in more detail referring to Examples and Comparative examples, but it should be understood that the invention is not to be construed as being limited in any way thereby. Also, unless otherwise specified, "parts" and "%" respectively means "parts by mass" and "% by mass".

Example 1

The curable resin compositions from No. 1 to No. 5 were obtained by blending each component described in the following Table 1.

Comparative Example 1

The comparative curable resin compositions from No. 1 to No. 7 were obtained by blending each component described in the following Table 1.

TABLE 1

| Curable resin composition | Polyfunctional epoxy component (parts by mass) | Cyanate component (parts by mass) | Curing agent component (parts by mass) |
|---|---|---|---|
| Ex. No. 1 | Compound a-2 (40) Compound a-8 (40) | PT-30 (20) | 2PHZ (0.5) |
| Ex. No. 2 | Compound a-2 (30) Compound a-8 (30) | PT-30 (40) | 2PHZ (0.5) |
| Ex. No. 3 | Compound a-2 (15) Compound a-8 (15) | PT-30 (70) | 2PHZ (0.5) |
| Ex. No. 4 | Compound a-2 (30) Compound a-8 (30) | DT-4000 (40) | 2PHZ (0.5) |
| Ex. No. 5 | Compound a-2 (30) Compound a-8 (30) | BADCy (40) | 2PHZ (0.5) |
| Comparative Ex. No. 1 | Compound a-2 (60) | PT-30 (40) | 2PHZ (0.5) |
| Comparative Ex. No. 2 | Compound a-8 (60) | PT-30 (40) | 2PHZ (0.5) |
| Comparative Ex. No. 3 | Compound a-8 (30) Compound a-2 (30) | — | 2PHZ (0.5) |
| Comparative Ex. No. 4 | Compound a-2 (30) NC-3000-FH (30) | PT-30 (40) | 2PHZ (0.5) |
| Comparative Ex. No. 5 | EP-4100E (30) Compound a-8 (30) | PT-30 (40) | 2PHZ (0.5) |
| Comparative Ex. No. 6 | EP-4100E (30) NC-3000-FH (30) | PT-30 (40) | 2PHZ (0.5) |
| Comparative Ex. No. 7 | EP-4100E (15) Compound a-3 (15) Compound a-8 (30) | PT-30 (40) | 2PHZ (0.5) |

The compounds a-2 and a-3 in the Table 1 are exemplary compounds described above, the compound a-8 is an exemplary compound above, and the components other than said a-2, a-3 and a-8 are as follows;

PT-30: Primaset PT-30 (phenol novolac cyanate manufactured by Lonza Co., Ltd.).

DT-4000: Primaset DT-4000 (dicyclo pentadiene phenol novolac cyanate manufactured by Lonza Co., Ltd.).

BADCy: Primaset BADCy (bisphenol A dicyanate manufactured by Lonza Co., Ltd.).

NC-3000-FH: biphenyl novolac type epoxy resin manufactured by Nippon Kayaku Co., Ltd.

EP-4100E: bisphenol A type diepoxy resin manufactured by ADEKA CORPORATION.

2PHZ: Official name is Curezol 2PHZ-PW. 2-phenyl-4, 5-dihydroxy methyl imidazole manufactured by SHIKOKU CHEMICALS CORPORATION.

1. Evaluation of Curable Resin Composition

The curable resin composition obtained was coated on the carrier film made from polyethylene terephthalate by using a bar coater, then the solvent was eliminated by drying at 100° C. for 20 minutes to manufacture a curable resin sheet.

The flexibility and tacky properties of each resin sheet obtained were evaluated by the following methods.

Results were shown in Table 2.

<Evaluation Method for Flexibility>

Using a turnup tester, the resin sheet was folded back 180-degree along an axis of a stick 2 mm in diameter. According to the folding back degree when a break or a crack was produced on the resin sheet, the evaluation was made as mentioned below.

○: Neither break nor crack was produced even when the resin sheet was folded back 180-degree.

Δ: Either break or crack was produced within the folding back angle range from 90° to 180°.

x: Either break or crack was produced within the folding back angle range from 0° to 90°.

<Evaluation Method for Low Tacky Properties>

In a temperature-controlled room maintained at 25° C., the surface of the resin sheet was pushed with a finger to leave behind a fingerprint. According to the state of the fingerprint left on the surface of resin sheet, the evaluation was made as mentioned below.

○: None of the fingerprint was observed.

Δ: The fingerprint was slightly observed.

x: The fingerprint was observed.

2. Evaluation of Cured Material

The resin sheet was thermally cured at 200° C. for 60 minutes, using an oven, then was cooled to peel off the carrier film, and a sheet-like cured resin material 100 μm thick was obtained.

The heat resistance of the cured resin material obtained was evaluated according to the following methods.

<Evaluation Method for Heat Resistance>

The cured material obtained by the above curing method was formed to be a square of 5 mm×60 mm, then the dynamic viscoelasticity thereof was measured by using the thermal analysis equipment (EXSTAR 6000: a product name manufactured by SII Nanotechnology Co., Ltd.), and calculated the tangent loss expressed by (Elastic Modulus Loss/Elastic Modulus Storage). The temperature corresponding to the maximum value of tangent loss was determined as a glass transition temperature (Tg).

The results were shown in Table 2.

In the Table 2, ">280" indicates that the Tg is higher than 280° C.

TABLE 2

| Curable resin composition | Flexibility | Tacky properties | Heat resistance (Tg) (° C.) |
|---|---|---|---|
| Ex. No. 1 | ○ | ○ | >280 |
| Ex. No. 2 | ○ | ○ | >280 |
| Ex. No. 3 | ○ | ○ | 265 |
| Ex. No. 4 | ○ | ○ | >280 |
| Ex. No. 5 | Δ | ○ | 260 |
| Comparative Ex. No. 1 | ○ | x | >280 |
| Comparative Ex. No. 2 | x | ○ | >280 |
| Comparative Ex. No. 3 | x | Δ | 180 |
| Comparative Ex. No. 4 | ○ | ○ | 217 |
| Comparative Ex. No. 5 | ○ | ○ | 200 |
| Comparative Ex. No. 6 | ○ | ○ | 185 |
| Comparative Ex. No. 7 | ○ | ○ | 230 |

From the results shown in the table 2, it was confirmed that the curable resin composition of the present invention has low tacky properties, and especially has the excellent flexibility when the phenol novolac compound is used as the cyanate compound (B) (Curable resin compositions No. 1-No. 4).

Furthermore, it was confirmed that the cured material of the curable resin composition of the present invention has the heat resistance even at a temperature of 260° C. or more.

On the other hand, it was confirmed that comparative curable resin compositions were not excellent all together in all of flexibility, low tacky properties, and heat resistance of a cured material, and particularly were poor in the heat resistance, since all Tg were 250° C. or less.

Example 2

The curable resin compositions from No. 6 to No. 10 were prepared by blending each component described in the following Table 3. Each compound of the polyfunctional epoxy components in Table 3 is exemplary compound described above.

TABLE 3

| Curable resin composition | Polyfunctional epoxy component (parts by mass) | Cyanate component (parts by mass) | Curing agent component (parts by mass) |
| --- | --- | --- | --- |
| Ex. No. 6 | Compound a-1 (30) Compound a-8 (30) | PT-30 (40) | 2PHZ (0.5) |
| Ex. No. 7 | Compound a-1 (30) Compound a-9 (30) | PT-30 (40) | 2PHZ (0.5) |
| Ex. No. 8 | Compound a-2 (30) Compound a-11 (30) | PT-30 (40) | 2PHZ (0.5) |
| Ex. No. 9 | Compound a-4 (30) Compound a-8 (30) | PT-30 (40) | 2PHZ (0.5) |
| Ex. No. 10 | Compound a-4 (30) Compound a-9 (30) | PT-30 (40) | 2PHZ (0.5) |

The resin sheets 100 μm thick were manufactured in the same manner as Example 1. The flexibility, low tacky properties and the heat resistance of each resin sheet obtained and the cured material thereof were evaluated in the same manner as Example 1. As for the evaluation of flexibility, however, a stick 0.5 mm in diameter was used instead of the stick 2 mm in diameter used in Example 1.

Results were shown in Table 4.

TABLE 4

| Curable resin composition | Flexibility | Tacky properties | Heat resistance (Tg) (° C.) |
| --- | --- | --- | --- |
| Ex. No. 6 | ○ | ○ | >280 |
| Ex. No. 7 | ○ | Δ | >280 |
| Ex. No. 8 | ○ | ○ | >280 |
| Ex. No. 9 | ○ | ○ | >280 |
| Ex. No. 10 | ○ | Δ | >280 |

From the results of Table 4, it was also confirmed that the curable resin compositions of the present invention have the excellent flexibility and heat resistance, and it was further confirmed that the curable resin compositions No. 6, 8 and 9 have low tacky properties in particular.

Example 3

The curable resin compositions obtained in Example 1 were blended with 0.5 parts by mass of 2-(3,4-epoxy cyclohexyl) ethyltrimethoxy silane as a silane coupling agent and 1.0 parts by mass of bisphenol A/bisphenol F mixed phenoxy phenoxy resin (YP-70 manufactured by Tohto Kasei Co., Ltd.) as a thermoplastic resin, according to the Table 5, to obtain the resin compositions from No. 11 to 16.

Comparative Example 3

Comparative resin compositions from No. 8 to No. 11 were obtained in the same manner as Example 3, except that the comparative curable resin compositions obtained in Comparative example 1 were used.

TABLE 5

| Resin composition | Curable resin composition (parts by mass) | Organic solvent (parts by mass) | Filler (parts by mass) |
| --- | --- | --- | --- |
| Ex. No. 11 | No. 2 (10) | 10 | Spherical alumina: 20 μm in average particle diameter (80) |
| Ex. No. 12 | No. 2 (10) | 10 | Spherical alumina: 20 μm in average particle diameter (55) Spherical alumina: 3 μm in average particle diameter (15) Spherical aluminum nitride: 1 μm in average particle diameter (10) |
| Ex. No. 13 | No. 4 (10) | 10 | Spherical alumina: 20 μm in average particle diameter (80) |
| Ex. No. 14 | No. 5 (10) | 10 | Spherical alumina: 20 μm in average particle diameter (80) |
| Ex. No. 15 | No. 2 (10) | 10 | Spherical alumina: 20 μm in average particle diameter (55) Spherical aluminum nitride: 1 μm in average particle diameter (25) |
| Ex. No. 16 | No. 2 (10) | 10 | Spherical aluminum nitride: 20 μm in average particle diameter (55) Sperical aluminum nitride: 5 μm in average particle diameter (15) Spherical aluminum nitride: 1 μm in average particle diameter (10) |
| Comparative Ex. No. 8 | Comparative No. 4 (10) | 10 | Spherical alumina: 20 μm in average particle diameter (80) |
| Comparative Ex. No. 9 | Comparative No. 5 (10) | 10 | Spherical alumina: 20 μm in average particle diameter (80) |
| Comparative Ex. No. 10 | Comparative No. 6 (10) | 10 | Spherical alumina: 20 μm in average particle diameter (80) |
| Comparative Ex. No. 11 | Comparative No. 7 (10) | 10 | Spherical alumina: 20 μm in average particle diameter (80) |

The resin sheets 100 μm thick were manufactured in the same manner as Example 1, by using the curable resin compositions obtained. From the viewpoint of molding workability of sheets, the flexibility and low tacky properties of the resin sheets obtained were evaluated in the same manner as Example 1. In addition, as for the cured materials obtained by curing the coated resin film according to the following method, the heat resistance, insulating properties and heat dissipation properties were evaluated by the following method.

Results were shown in Table 6.

1. Evaluation of Resin Composition
<Evaluation Method for Flexibility>
The evaluation was carried out in the same manner as Example 2.
<Evaluation Method for Low Tacky Properties>
The evaluation was carried out in the same manner as Example 1.

2. Evaluation of Cured Resin Material
The sheet-like cured resin materials were manufactured in the same manner as Example 1, and the following evaluations were carried out.
<Evaluation Method for Heat Resistance>
The evaluation was carried out in the same manner as Example 1.

<Evaluation Method for Insulating Properties>

After the resin sheet and beaten-copper were laminated on the aluminum substrate in order, pressing was carried out to cure the resin sheet and manufactured a metal base board.

The beaten-copper of the base board was etched so that two circular rings having the same center, that is, a circular ring having a ring width of 10 mm and an outside diameter of 50 mm and a circular ring having a ring width of 10 mm and an outside diameter of 80 mm, were left to obtain the test piece having the surface electrodes.

The volume resistance values of the cured materials were measured according to the JIS-K-6911, by using these test pieces. Namely, each test piece was set in the oven at 160° C. to preheat for 30 minutes or more, then 500V (DC) was applied to the test piece by using the VOLTAGE APPLICATION DEVICE (8340A ULTRA HIGH RESISTANCE METER manufactured by ADCMT Co., Ltd.). One minute later, the volume resistance value was measured.

<Evaluation Method for Heat Dissipation Properties>

The each thermal diffusion ratio $\alpha(m^2/s)$ of the sheet-like cured resin material described above was measured by using the diffusion ratio measuring apparatus (Mobile-I: name of product manufactured by ai-Phase Co., Ltd.) to calculate the thermal conductivity K expressed by the following formula.

$$K = \alpha \times \rho \times Cp$$

wherein, K is thermal conductivity (W/m·K), $\alpha$ is thermal diffusion ratio (m$^2$/second), $\rho$ is density (kg/m$^3$), Cp is specific heat capacity (J/kg·K).

TABLE 6

| Resin composition | Flexibility | Tacky properties | Heat resistance (° C.) | Insulating properties (Ω) | Heat dissipation properties (W/m · K) |
|---|---|---|---|---|---|
| Ex. No. 11 | ○ | ○ | >280 | 3.1E+10 | 4.0 |
| Ex. No. 12 | ○ | ○ | >280 | 3.1E+10 | 5.1 |
| Ex. No. 13 | ○ | ○ | >280 | 2.3E+10 | 3.9 |
| Ex. No. 14 | Δ | ○ | 250 | 1.0E+10 | 3.8 |
| Ex. No. 15 | ○ | ○ | >280 | 3.1E+10 | 8.5 |
| Ex. No. 16 | ○ | ○ | >280 | 3.1E+10 | 12 |
| Comparative Ex. No. 8 | ○ | ○ | 217 | 7.0E+0.8 | 3.8 |
| Comparative Ex. No. 9 | ○ | ○ | 200 | 5.0E+0.8 | 3.6 |
| Comparative Ex. No. 10 | ○ | ○ | 185 | 1.0E+0.8 | 3.6 |
| Comparative Ex. No. 11 | ○ | ○ | 230 | 9.0E+0.9 | 4.0 |

From the results shown in the table 6, it was confirmed that the resin composition of the present invention has low tacky properties, and particularly the flexibility and heat resistance are excellent when the curable resin composition containing phenol novolac cyanate is used (resin compositions from No. 1 to 5). In addition, it was confirmed that the cured material obtained by curing the resin composition of the present invention has an excellent heat resistance and excellent insulating properties, and also has better heat dissipation properties than conventional products.

INDUSTRIAL APPLICABILITY

The curable resin composition of the present invention, and the resin composition of the present invention obtained by blending the curable resin composition of the present invention with a noncurable component are excellent in coating properties, low tacky properties and the flexibility of coating film before curing, and, even after curing, they are excellent in the flexibility and adhesive properties to a base material, and also they can realize the excellent heat resistance and insulating properties. Therefore, it is possible to be applied widely as resin base materials of various members in electrical and electronics fields such as a printed wiring board, an insulating material for sealing a semiconductor, a power semiconductor, a LED illumination, a LED back light, a power LED and a solar battery. In particular, it is preferable to be used as an adhesive sheet having heat dissipation properties that is used for bonding a heat-generating device. Therefore, the curable resin composition and resin composition of the present invention are remarkably useful for the industry.

The invention claimed is:

1. A curable resin composition comprising (A) 100 parts by mass of polyfunctional epoxy component, (B) 25 to 200 parts by mass of polyfunctional cyanic acid ester compound having two or more cyanato groups and (C) 0.5 to 20 parts by mass of an imidazole compound as a curing agent, wherein said polyfunctional epoxy component (A) is comprised of (A1) a trifunctional epoxy compound having three glycidyl groups in a molecule and (A2) a tetrafunctional epoxy compound having four glycidyl groups in a molecule so that a ratio of (A1):(A2) is from 10:90 to 90:10 in terms of mass, wherein said trifunctional epoxy compound (A1) is an epoxy compound which has an aromatic hydrocarbon moiety having one or more aromatic rings which is unsubstituted or substituted by halogen atoms, wherein no methylene group are contained but may contain an ether bond between carbon-carbon atoms, and three glycidyloxy groups, or one glycidyloxy group and one diglycidylamino group are bonded to said aromatic ring(s); and said tetrafunctional epoxy compound (A2) is an epoxy compound which has an aromatic hydrocarbon moiety having one or more aromatic rings which are unsubstituted or substituted by a halogen atom, wherein no methylene group is contained but may contain an ether bond between carbon-carbon atoms, and at least one group selected from the glycidyloxy group and the diglycidyl amino group is bonded to said aromatic ring(s).

2. The curable resin composition according to claim 1, wherein at least said trifunctional epoxy compound (A1) or tetrafunctional epoxy compound (A2) is an epoxy compound having an aromatic ring to which the diglycidyl amino group is bonded.

3. The curable resin composition according to claim 1, wherein said trifunctional epoxy compound (A1) is a compound having an aromatic ring to which the diglycidyl amino group is bonded.

4. The curable resin composition according to claim 1, wherein 1 to 25 parts by mass of a silane coupling agent (D) is contained relative to 100 parts by mass of said component (A).

5. A resin composition comprising a curable component wherein said curable component includes the curable resin composition according to claim 1, and a noncurable component, wherein the content ratio of said curable resin component is from 5 to 99% by mass.

6. The resin composition according to claim 5, wherein 50 to 95% by mass of a filler (E) is contained as said noncurable component.

7. A resin sheet, obtained from the curable resin composition according to claim 1, or a resin composition comprising a curable component including the curable resin composition according to claim 1 and a noncurable component, wherein the content ratio of said curable resin component is from 5 to 99% by mass, or a resin composition comprising a curable component including the curable resin composition according to claim 1 and a noncurable component, wherein the content ratio of said curable resin component is from 5 to 99% by mass and wherein 50 to 95% by mass of a filler (E) is contained as said noncurable component.

8. A cured material obtained by i) curing the curable resin composition described in claim 1, or ii) by curing the curable resin composition described in claim 1 and a noncurable component, wherein the content ratio of said curable resin component is from 5 to 99% by mass, or iii) by curing the curable resin composition described in claim 1 and a noncurable component, wherein the content ratio of said curable resin component is from 5 to 99% by mass, and wherein 50 to 95% by mass of a filler (E) is contained as said noncurable component, or (iv) by curing a resin sheet of i), ii) or iii) above.

* * * * *